INVENTOR.
PAUL B. REEVES,
BY Harold B. Hood.
ATTORNEY.

INVENTOR.
PAUL B. REEVES,
BY: Harold B. Wood.
ATTORNEY.

Patented Apr. 28, 1953

2,636,396

UNITED STATES PATENT OFFICE 2,636,396

ADAPTER CONTROL ASSEMBLY FOR VARIABLE-SPEED POWER TRANSMISSION

Paul B. Reeves, Columbus, Ind., assignor to Reeves Pulley Company, Columbus, Ind., a corporation of Indiana Application January 3, 1950, Serial No. 136,602

5 Claims. (Cl. 74—230.17)

The present invention relates to an adapter control assembly for variable-speed power transmission, and is primarily concerned with the provision of an assembly of parts which, purchased as a "package," may be interposed, by the purchaser, between a power source and a machine to be driven thereby, to transmit power therebetween at incrementally variable speeds within the range of the assembly. The primary object of the invention may be said to be to provide, at minimum cost, a group of parts which, when properly assembled with a power source and a machine to be driven therefrom, will cooperate to provide for transmission of power therebetween at incrementally variable speed ratios.

A further object of the invention is to provide, through the medium of a minimum number of parts and at a minimum cost, mechanism which will operate to transmit power, at variable speeds, from a source to a machine to be driven, such mechanism not being required to include any journal mountings for the power-transmitting elements, but being so devised that such elements may be fully and effectively supported through the bearings or journal mountings of the rotating parts of the power source and of the machine to be driven.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figures 1, 2, 3, 4:
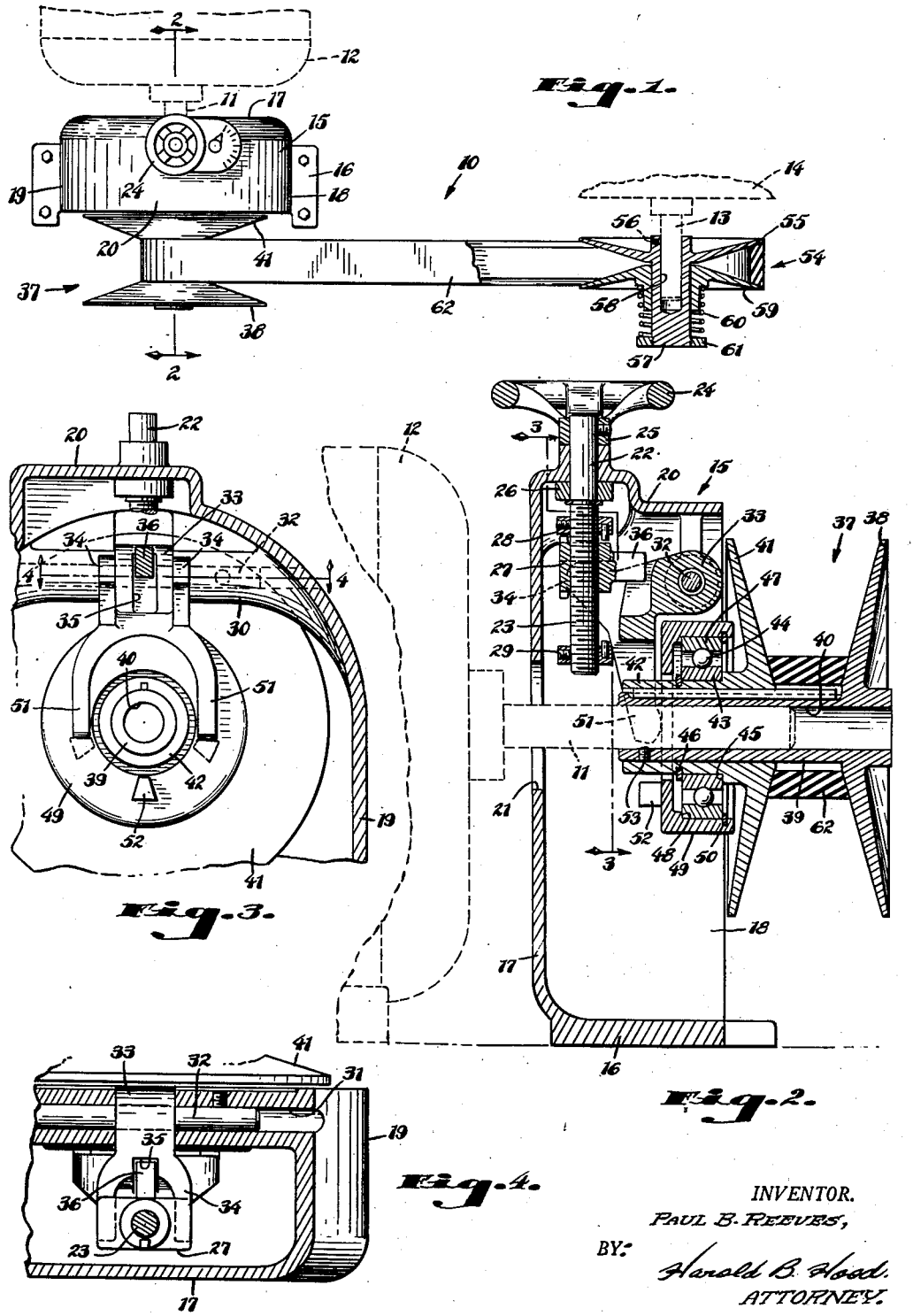
Fig. 1 is a plan view of a variable-speed transmission kit constructed in accordance with my invention and operatively installed between a motor and a machine to be driven, both indicated fragmentarily in broken lines.
Fig. 2 is a vertical section, drawn to an enlarged scale, and taken substantially on the line 2—2 of Fig. 1.
Fig. 3 is a fragmentary section taken substantially on the line 3—3 of Fig. 2.
Fig. 4 is a fragmentary horizontal section taken substantially on the line 4—4 of Fig. 3.

Referring more particularly to the embodiment of my invention illustrated in Figs. 1-4, the reference numeral 10 indicates generally my transmission kit installed operatively between the spindle 11 of an electric motor 12, symbolizing any suitable source of rotary power, and the power-receiving shaft 13 of a machine 14 to be driven therefrom. A frame or housing 15, in the illustrated embodiment of the invention, comprises a base or foot 16, adapted to rest or be secured in place on the floor or other support on which is located the motor 12, for instance; an upstanding wall 17, lateral walls 18 and 19, and a top wall 20. The wall 17 is provided, at a suitable level above the base 16, with an opening 21, through which the motor spindle is adapted to extend; and the dimensions of said opening substantially exceed the transverse dimensions of the spindle, for a reason which will become apparent hereinafter.

A shaft 22 is journalled, intermediate its ends, in a suitable bearing in the top wall 20, and projects both upwardly from said wall outside the frame, and downwardly from said wall inside the frame, terminating at or about the level of the upper boundary of the opening 21. The portion of said shaft inside the frame is threaded, as at 23; and a handwheel or other manipulating device 24 is fixed to the upper projection of said shaft outside the frame. Collars 25 and 26 fixed to the shaft 22 hold the same against axial movement relative to the frame. A nut 27 is threadedly mounted on the portion 23 of the shaft, and its movement axially of the shaft is limited by stop collars 28 and 29 adjustably fixed to the shaft.

A crossbar 30, or other suitable bearing means, formed to provide a bore or pocket 31, is integrally or otherwise supported in the frame near the top wall 20, more remote from the wall 17 than is the shaft 22, with its axis substantially horizontal and parallel with the wall 17. Trunnion means, such as a bar 32, is supported in the bore 31, and provides a support for a rocker 33 oscillably mounted on said bar. The rocker 33 includes a yoke 34 straddling the nut 27 and operatively engaging the same so that said yoke will follow the movements of said nut. A further function of the yoke is to retain the nut against rotary movement about the axis of the screw 22 and, in this form of the invention, the yoke is shown to be provided with a slot 35 in which is slidably received a tongue 36 projecting radially from said nut.

An expansible, or variable-effective-diameter V-pulley is indicated generally by the reference numeral 37. Said pulley comprises a coned disc 38 having an axially-elongated hub 39 projecting from the apex of its coned face and formed with an axial bore 40; and a mating coned disc 41 axially slidably supported on said hub with its coned face presented toward the coned face of the disc 38. On the hub 42 of the disc 41 is sleeved the inner race 43 of an anti-friction bearing 44, said race being axially confined between a shoulder 45 on said hub and a snap ring 46 mounted thereon. The outer race 47 of the bearing, in turn, is confined between a shoulder 48 in a housing member 49 and a snap ring 50 secured therein.

The pulley 37 is adapted to be mounted for support on the spindle 11, or other source of rotary power, by entering such spindle in the bore 40 of the hub 39, and said hub will preferably carry a set screw 53 or other device whereby the pulley may be fixedly secured to said spindle. The rocker 33 includes a second yoke 51, angularly related to the yoke 34 and so positioned that, when the frame 15 is properly associated with the spindle 11 and the pulley 37 is properly mounted on said spindle, the yoke 51 will operatively engage the bearing housing 49, so that, as the rocker 33 swings in a counterclockwise direction, the yoke 51 will press against the bearing housing to shift the disc 41 toward the disc 38. Preferably, the bearing housing will be provided with a finger 52 which, upon any tendency of the housing to rotate in either direction, will abut one or the other finger of the yoke 51 to arrest that tendency.

It will now be apparent that the oversize dimensions of the opening 21 will provide for variations in the level of the spindle 11 relative to the floor or other support on which the motor 12 and the frame 15 are commonly mounted. Since there is no fixed connection between the yoke 51 and the bearing housing 49, the cooperative association between those elements will adapt itself to any such variations. As illustrated, the frame 15 does not include any wall opposite the wall 17, and such an arrangement is presently deemed optimum, since it eliminates any problem of compensation for variations in the position of the bearing housing 49 resulting from such level differences. The pulley 37, of course, will preferably be positioned entirely outside the frame 15. Variations in the length of the spindle 11 can be accommodated by shifting the frame 15 bodily toward or away from the motor 12.

The assembly of the present invention includes, also, a resiliently expansible V-pulley indicated generally by the reference numeral 54. This pulley comprises a coned disc 55 adapted to be secured, by a set screw 56 or other suitable means, to the power-receiving shaft 13 of a machine 14 to be driven, said disc being provided with an axially elongated hub 57 projecting from its coned face and provided with a bore 58 adapted to receive said shaft 13. A mating disc 59 is axially slidably supported on the hub 57 and is constantly resiliently urged toward the disc 55 by a coiled spring 60 confined between the disc 59 and a suitable abutment 61 at the outer end of the hub 57. An edge-active belt 62 provides a driving connection between the pulleys 37 and 54.

It will be seen from the above description that the pulley 37 is supported wholly on the spindle 11 which, in turn, is supported wholly in the journal bearings built into the motor 12; and that the pulley 54 is supported wholly on the shaft 13 which, in turn, is supported wholly in the journal bearings built into the machine 14. Thus, I have provided an assembly for establishing a variable speed transmission of power between the motor 12 and the machine 14, without being required to provide any special supporting bearings for the power-transmitting elements of the assembly.

With the parts in their illustrated positions, the effective diameter of the pulley 37 is a minimum, and that of the pulley 54 is a maximum. If, now, with the drive in operation, the shaft 22 is rotated to move the nut 27 downwardly, the rocker 33 will be swung in a counter-clockwise direction to press the disc 41 toward the disc 38. The belt 62 will thereby be squeezed outwardly between the coned faces of the two discs, being correspondingly pulled more deeply between the coned faces of the discs 55 and 59 to force the disc 59 away from the disc 55 against the tendency of the spring 60. Thus, the effective diameter of the pulley 37 will be increased, and that of the pulley 54 will be decreased to increase the speed of the shaft 13. If the shaft 22 is turned in the opposite direction, the lateral pressure of the discs 38 and 41 against the belt will be relaxed; and the spring 60 will thereby be permitted to move the disc 59 toward the disc 55, to return the parts toward their illustrated positions, reducing the speed of the shaft 13.

Figure 5:
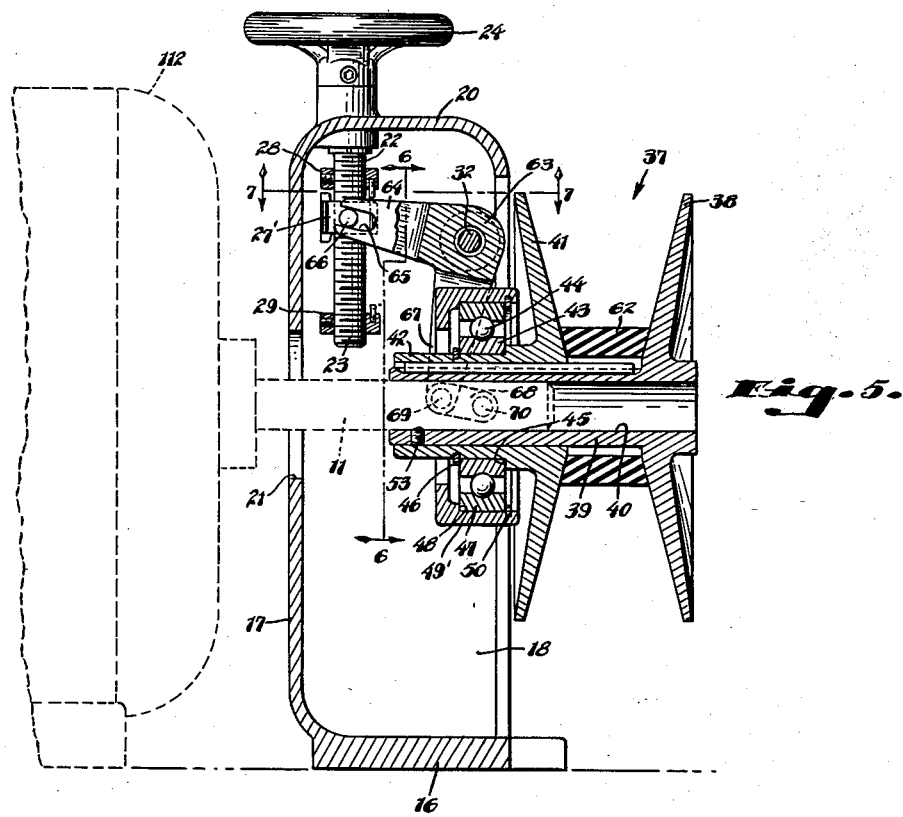
Fig. 5 is a view similar to Fig. 2 and illustrating a modified form of my invention.
Figures 6, 7:
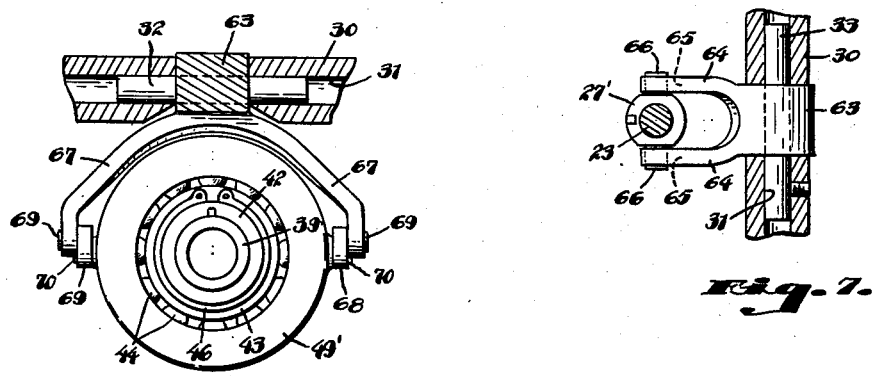
Fig. 6 is a fragmentary section taken substantially on the line 6—6 of Fig. 5.
Fig. 7 is a fragmentary section taken substantially on the line 7—7 of Fig. 5.

In the embodiment of my invention illustrated in Figs. 5–7, the rocker construction and its manner of association with the nut and the bearing housing are somewhat different. In other respects, the structure is substantially identical with that disclosed above.

The rocker 63 of this form of the invention comprises a yoke 64 each of whose arms is bifurcated at its free end as at 65 to straddle a pin 66 projecting radially from the nut 27'. This arrangement provides a two-way drive connection between the nut and the rocker.

The free end of each arm of the yoke 67 of the rocker 63 is positively connected to the bearing housing 49' by a link 68, one end of each of said links being pivotally connected to a yoke arm by a pin 69, and the other end of each link being pivotally connected to a pin 70 projecting radially from the housing 49'. The axes of said pivotal connection are parallel with the axis of the trunnion 32. Thus, a two-way drive connection is provided, also, between the rocker 63 and the bearing housing 49', so that upward movement of the nut 27' will exert a positive retracting force upon the disc 41. Yet the drive connection between the rocker 63 and the bearing housing 49', through the links 68, is still sufficiently flexible to accommodate itself to the variations in the level of the spindle 11 as discussed above.

I claim as my invention:

1. An adapter assembly for providing a variable-speed drive between a power source including a power-delivery shaft, and a machine including a power-receiving shaft, said assembly comprising a one-piece, self-supporting frame including a base, a vertical wall and a top wall substantially parallel with said base, that side of said frame opposite said vertical wall being open, a screw shaft journalled in said top wall upon an axis substantially parallel with said vertical wall for rotation but held against axial reciprocation with respect thereto, a nut threadedly mounted on said screw shaft, a first variable-effective-diameter pulley comprising a first coned disc having an axially-elongated hub and a second coned disc axially-reciprocably supported on said hub with its coned face in coactive relation to the coned face of said first disc, a thrust bearing cooperatively connected with said second disc, a rocker oscillably journalled in said frame upon an axis transverse with respect to said screw shaft axis and substantially parallel with said vertical wall and having a portion operatively engaged with said nut to move therewith and to hold said nut against rotation, and having another part operatively engaging said thrust bearing to shift the same axially relative to said hub, a second variable-effective diameter pulley, an edge-active belt providing a driving connection between said pulleys, said vertical wall being provided with an opening for accommodating one of said shafts, said hub being adapted to be sleeved on said one shaft within said frame, and said second pulley being adapted to be mounted on the other of said shafts outside said frame, and means carried by one disc of each pulley for securing such pulley to its shaft.

2. An adapter assembly for providing a variable-speed drive between a power source including a power-delivery shaft, and a machine including a power-receiving shaft, said assembly comprising a frame, a screw shaft journalled for oscillation but held against axial reciprocation in said frame, a nut threadedly mounted on said screw shaft, a first variable-effective-diameter pulley comprising a first coned disc having an axially-elongated hub and a second coned disc axially reciprocably supported on said hub with its coned face in coactive relation to the coned face of said first disc, a thrust bearing cooperatively connected with said second disc, a rocker oscillably journalled in said frame and having a portion operatively engaged with said nut to move therewith and to hold said nut against rotation, and having another part operatively connected to said thrust bearing to shift the same axially relative to said hub, a second variable-effective-diameter pulley, an edge-active belt providing a driving connection between said pulleys, said frame being provided with an opening for accommodating one of said shafts, said hub being adapted to be sleeved on said one shaft within said frame, and said second pulley being adapted to be mounted on the other of said shafts outside said frame, and means carried by one disc of each pulley for securing such pulley to said shaft, said frame comprising a self-supporting structure having a base and having a vertical wall, said opening being located in said vertical wall and having transverse dimensions substantially exceeding those of said shaft, the opposite side of said frame being open to accommodate said first pulley, and the operative connection between said other part of said rocker and said bearing being flexible, in a direction transverse to the axis of said rocker to accommodate variations in the spacing of said shaft from said base.

3. The assembly of claim 2 in which the operative connection between said other part of said rocker and said bearing includes a link pivotally connected to said rocker part and to said bearing upon axes substantially parallel with said rocker axis.

4. The assembly of claim 2 in which the operative connection between said other part of said rocker and said bearing is capable of supporting said bearing from said rocker part, and said bearing is axially fixed to said second coned disc.

5. In a device of the class described, a unitary frame including a base, a side wall, and a top wall, a screw shaft journalled in said top wall and projecting vertically in opposite directions therefrom, means securing said screw shaft against axial movement relative to said top wall, a nut threadedly mounted on said screw shaft within said frame, said side wall being provided with an opening located between the lower end of said screw shaft and said base, a rocker mounted in said frame and journalled therein upon a horizontal axis near said top wall, more remote from said side wall than is said screw shaft, and substantially parallel with said side wall, said rocker having a part operatively engaging said nut to move therewith and to hold said nut against rotation, an expansible V-pulley comprising a coned disc located outside said frame and having an axially-elongated hub projecting from the apex of its coned face into said frame, and a mating coned disc axially slidably mounted on said hub outside said frame with its coned face presented toward the coned face of said first-named disc, said mating coned disc having a hub projecting into said frame, a thrust bearing within said frame axially fixed to said second disc hub, said rocker having another part within said frame and coactive with said bearing, upon oscillation of said rocker about its axis, to shift said second coned disc axially, a resiliently-expansible V-pulley outside said frame, and an edge-active belt coactive with said V-pulleys to provide a driving connection therebetween.

PAUL B. REEVES.

References Cited in the file of this patent

UNITED STATES PATENTS

| Number | Name | Date |
| --- | --- | --- |
| 2,021,136 | Reeves | Nov. 19, 1935 |
| 2,183,267 | Rieser | Dec. 12, 1939 |
| 2,224,369 | Reeves | Dec. 10, 1940 |
| 2,398,235 | Luenberger | Apr. 9, 1946 |